US012249809B2

(12) United States Patent
Shimada et al.

(10) Patent No.: US 12,249,809 B2
(45) Date of Patent: Mar. 11, 2025

(54) SPARK PLUG INSULATOR AND SPARK PLUG

(71) Applicant: Niterra Co., Ltd., Nagoya (JP)

(72) Inventors: Hiroki Shimada, Nagoya (JP); Haruki Yoshida, Nagoya (JP); Kengo Fujimura, Nagoya (JP); Takuto Koba, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 0 days.

(21) Appl. No.: 18/616,670

(22) Filed: Mar. 26, 2024

(65) Prior Publication Data

US 2024/0332918 A1 Oct. 3, 2024

(30) Foreign Application Priority Data

Mar. 29, 2023 (JP) ................................ 2023-053309

(51) Int. Cl.
*H01T 13/38* (2006.01)

(52) U.S. Cl.
CPC .................................... *H01T 13/38* (2013.01)

(58) Field of Classification Search
CPC ...................................................... H01T 13/38
USPC ........................................................ 313/118
See application file for complete search history.

(56) References Cited

U.S. PATENT DOCUMENTS

2018/0374601 A1* 12/2018 Yoshida et al.
2020/0112146 A1* 4/2020 Yokoyama et al.

FOREIGN PATENT DOCUMENTS

JP 2020-057559 A 4/2020

* cited by examiner

*Primary Examiner* — Christopher M Raabe
(74) *Attorney, Agent, or Firm* — Renner, Otto, Boisselle & Sklar, LLP

(57) ABSTRACT

When a force to bend a spark plug insulator is applied to the spark plug insulator to fracture the spark plug insulator, for a range including a starting point of the fracture out of two ranges into which a fracture surface created by the fracture is divided by a plane which is a plane perpendicular to a direction of the force and includes the axial line, an average of areas of particles appearing in a planar image of the range is 4.4 $\mu m^2$ or larger and 8.0 $\mu m^2$ or smaller, and a maximum area of the particles is 600 $\mu m^2$ or smaller. The particles include large particles having an area of 60 $\mu m^2$ or larger and 600 $\mu m^2$ or smaller, and, as the large particles, 0.1 particles/$mm^2$ or more are present per unit area of the planar image.

4 Claims, 2 Drawing Sheets

SPARK PLUG INSULATOR AND SPARK PLUG

FIELD OF THE INVENTION

The present invention relates to a spark plug insulator and a spark plug.

BACKGROUND OF THE INVENTION

Japanese Patent Application Laid-Open (kokai) No. 2020-57559 discloses conventional art in which, in a spark plug including an insulator formed of an alumina-based sintered body, the average grain size of crystal grains of the insulator is set to 1.5 μm or smaller and the standard deviation of the particle size distribution of the crystal grains is set to 1.2 μm or smaller in order to improve the mechanical strength of the insulator.

In the conventional art, there is a demand for improving the bending strength and the thermal shock resistance of the insulator.

The present invention has been made to meet this demand, and an object of the present invention is to provide a spark plug insulator and a spark plug capable of improving bending strength and thermal shock resistance.

SUMMARY OF THE INVENTION

In order to attain the above object, a first aspect of the present invention is directed to a spark plug insulator composed of an alumina-based sintered body provided with an axial hole extending along an axial line, wherein, when a force to bend the spark plug insulator is applied to the spark plug insulator to fracture the spark plug insulator, for a range including a starting point of the fracture out of two ranges into which a fracture surface created by the fracture is divided by a plane which is a plane perpendicular to a direction of the force and includes the axial line, an average of areas of particles appearing in a planar image of the range is 4.4 $\mu m^2$ or larger and 8.0 $\mu m^2$ or smaller, and a maximum area of the particles is 600 $\mu m^2$ or smaller. The particles include large particles having an area of 60 $\mu m^2$ or larger and 600 $\mu m^2$ or smaller, and, as the large particles, 0.1 particles/$mm^2$ or more are present per unit area of the planar image.

A second aspect is directed to the spark plug insulator according to the first aspect, wherein, as the large particles, 6.2 particles/$mm^2$ or less are present per unit area of the planar image.

A third aspect is directed to the spark plug insulator according to the first or second aspect, wherein the particles include small particles having an area of 20 $\mu m^2$ or larger and 59 $\mu m^2$ or smaller, and, as the small particles, 613 particles/$mm^2$ or more and 2270 particles/$mm^2$ or less are present per unit area of the planar image.

A fourth aspect is directed to a spark plug including the spark plug insulator according to any one of the first to third aspects.

Since the average of the areas of the particles appearing in the planar image of the spark plug insulator is 4.4 $\mu m^2$ or larger and 8.0 $\mu m^2$ or smaller, the maximum area of the particles is 600 $\mu m^2$ or smaller, and 0.1 particles/$mm^2$ or more are present per unit area of the planar image as the large particles having an area of 60 $\mu m^2$ or larger and 600 $\mu m^2$ or smaller, bending strength and thermal shock resistance can be improved.

DETAILED DESCRIPTION OF THE INVENTION

Figure 1:
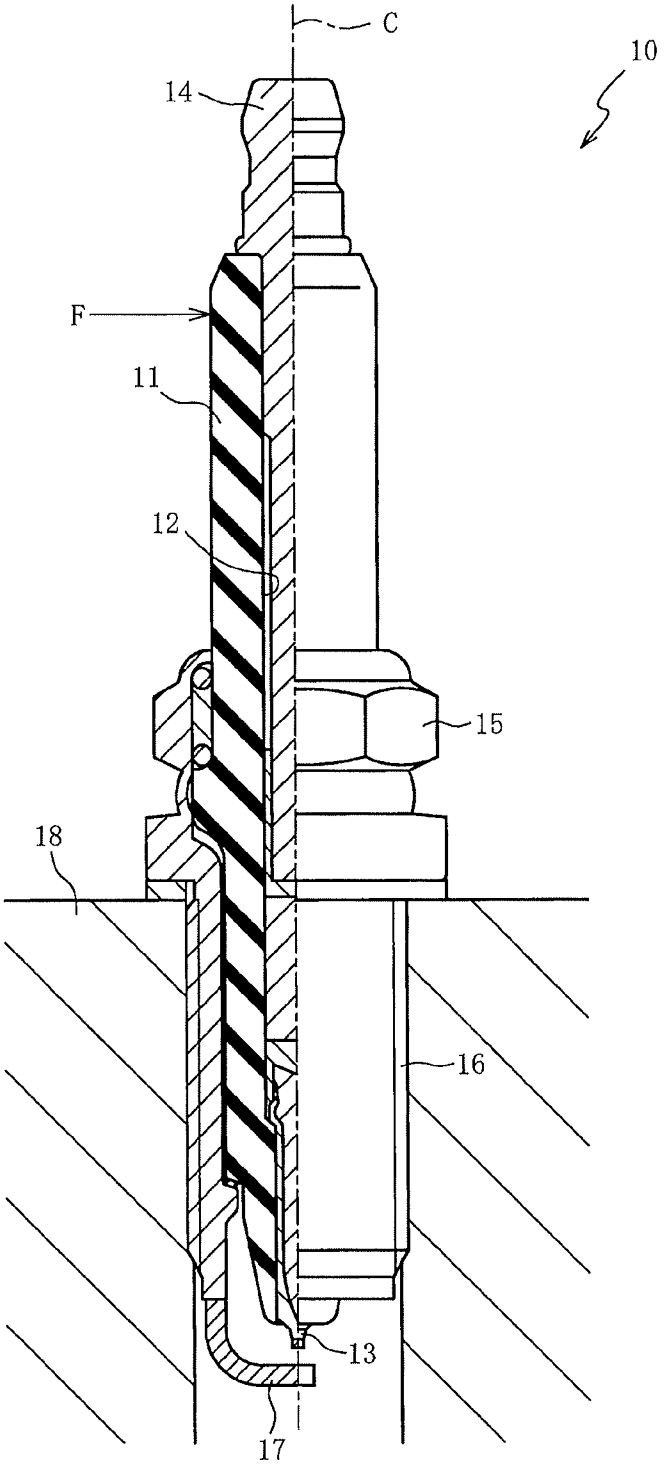
FIG. 1 is a half cross-sectional view of a spark plug according to one embodiment.

Hereinafter, preferred embodiments of the present invention will be described with reference to the accompanying drawings. FIG. 1 is a half cross-sectional view which is a combination of an outline view and a full cross-sectional view with an axial line C of an axial hole 12 of a spark plug 10 according to one embodiment as a boundary. The lower side of the drawing sheet of FIG. 1 is referred to as front side of the spark plug 10, and the upper side of the drawing sheet is referred to as rear side of the spark plug 10. The spark plug 10 includes an insulator 11 (spark plug insulator). The insulator 11 is a cylindrical member provided with the axial hole 12 extending along the axial line C, and is an alumina-based sintered body which is excellent in mechanical property and in insulation property under high temperature.

A bar-shaped center electrode 13 made of metal is placed in the axial hole 12 of the insulator 11. The center electrode 13 is formed such that a core material having excellent thermal conductivity is embedded in a base material. The base material is formed from a metal material composed of Ni or an alloy containing Ni as a main component. The core material is formed from copper or an alloy containing copper as a main component. The core material may be omitted.

A metal terminal 14 is a bar-shaped member to which an ignition device (not shown) is connected, and is formed from a conductive metal material (e.g., low-carbon steel or the like). The front side of the metal terminal 14 is placed in the axial hole 12 of the insulator 11, and the rear side of the metal terminal 14 protrudes from the insulator 11. The metal terminal 14 is electrically connected to the center electrode 13 in the axial hole 12.

A metal shell 15 is a substantially cylindrical member formed from a conductive metal material (e.g., low-carbon steel or the like). The metal shell 15 is placed on the outer circumference of the insulator 11. An external thread 16 is provided on the front side of the metal shell 15.

A ground electrode 17 is a bar-shaped member made of metal (e.g., nickel-based alloy) and connected to the metal shell 15. A spark gap is formed between the ground electrode 17 and the center electrode 13.

The spark plug 10 is manufactured, for example, by the following method. The center electrode 13 is inserted into the axial hole 12 of the insulator 11, and then the axial hole 12 is filled with conductive powder containing a glass component. The metal terminal 14 is inserted from the rear side of the axial hole 12, and then is, for example, press-fitted while being heated to a temperature higher than the softening point of the glass component contained in the powder, whereby a load is applied to the powder in the axial direction by the metal terminal 14. The powder is compressed and sintered, and the center electrode 13 and the metal terminal 14 are electrically connected to each other in the axial hole 12. Next, the metal shell 15 to which the ground electrode 17 is connected is assembled to the outer circumference of the insulator 11, then the ground electrode 17 is bent, and a spark gap is set between the ground electrode 17 and the center electrode 13, to obtain the spark plug 10.

An example of a method for manufacturing the insulator 11 will be described. The insulator 11 is manufactured through steps of slurry preparation, defoaming, granulation, molding, grinding, and baking. These steps will be described sequentially.

The slurry preparation step is a step of mixing raw material powder, a binder, and a solvent to prepare a slurry. For the raw material powder, powder of a compound that converts into alumina by baking (hereinafter referred to as "Al compound powder") is used as a main component. As the Al compound powder, for example, alumina powder is used.

In the slurry preparation step, a pulverizing step is performed for the purpose of mixing and pulverizing the raw material powder. The pulverizing step is performed using a wet type pulverizer that uses a ball mill or the like. The diameter of each ball used in the wet type pulverizer is not particularly limited as long as the object of the present invention is attained, but is preferably 2 mm or larger and 20 mm or smaller, more preferably 2 mm or larger and 10 mm or smaller, and further preferably 2 mm or larger and 6 mm or smaller. The balls may be a combination of two or more types having different diameters. By such a pulverizing step, the raw material powder has a small variation in particle size (particle diameter) and a sharp particle size distribution. When such raw material powder is used, the size of particles can be controlled and the sintered density can be increased in an alumina-based sintered body obtained after sintering.

The particle diameter (particle diameter after pulverizing) of the Al compound powder (alumina powder or the like) is not particularly limited as long as the object of the present invention is attained, and is, for example, preferably 1.5 μm or larger and more preferably 1.7 μm or larger, and is preferably 2.5 μm or smaller and more preferably 2.0 μm or smaller. When the particle diameter of the Al compound powder is in such a range, the number of defects in the insulator is reduced, and an appropriate sintered density is obtained. The particle diameter is a median diameter (D50) on a volume basis as measured by a laser diffraction method (Microtrac particle size distribution measuring apparatus, product name "MT-3000", manufactured by NIKKISO CO., LTD.).

The Al compound powder is preferably prepared such that the amount of the Al compound powder is 90 mass % or larger in oxide equivalent when the mass (in oxide equivalent) of the alumina-based sintered body after baking is 100 mass %. The amount of the Al compound powder is more preferably 90 mass % or larger and 98 mass % or smaller, and further preferably 90 mass % or larger and 97 mass % or smaller. The raw material powder may contain powder other than the Al compound powder as long as the object of the present invention is attained.

The binder is added to the slurry for the purpose of, for example, improving the moldability of the raw material powder. Examples of such a binder include hydrophilic binding agents such as polyvinyl alcohol, aqueous acrylic resin, gum arabic, and dextrin. These hydrophilic binding agents may be used individually, or two or more of these hydrophilic binding agents may be used in combination. The blending amount of the binder is not particularly limited as long as the object of the present invention is attained. For example, the binder is blended at a ratio of 1 to 10 parts by mass, preferably 3 to 7 parts by mass, to 100 parts by mass of the raw material powder.

The solvent is used for the purpose of, for example, dispersing the raw material powder, etc. Examples of the solvent include water, alcohols, etc. These solvents may be used individually, or two or more of these solvents may be used in combination. The blending amount of the solvent is not particularly limited as long as the object of the present invention is attained. For example, the solvent is blended at a ratio of 23 to 40 parts by mass, preferably 25 to 35 parts by mass, to 100 parts by mass of the raw material powder. The slurry may contain another component other than the raw material powder, the binder, and the solvent, if necessary. For mixing the slurry, a known stirring and mixing apparatus or the like can be used.

The prepared slurry may be defoamed if necessary. In the defoaming step, for example, a container containing the slurry after mixing (kneading) is placed in a vacuum defoaming apparatus, and is placed in a low-pressure environment with reduced pressure, thereby removing air bubbles contained in the slurry. By comparing the density of the slurry before and after defoaming, the amount of air bubbles in the slurry can be grasped.

The granulation step is a step of producing spherical granulated powder from the slurry containing the raw material powder, etc. Examples of a method for producing granulated powder from the slurry is not particularly limited as long as the object of the present invention is attained, and an example of the method is a spray-drying method. In the spray-drying method, the slurry is spray-dried using a predetermined spray-dryer apparatus, thereby obtaining granulated powder having a predetermined particle diameter. The particle diameter of the granulated powder is not particularly limited as long as the object of the present invention is attained, but is, for example, preferably not greater than 212 μm pass ≥95% and more preferably not greater than 180 μm pass ≥95%.

The molding step is a step of molding the granulated powder into a predetermined shape using a molding die, to obtain a molded body. The molding step is performed by rubber press-molding, metal mold press-molding, or the like. In the case of the present embodiment, the pressure (pressing pressure increase rate) applied to the molding die (e.g., inner and outer rubber dies of a rubber press-molding machine) from the outer circumference side is adjusted so as to increase stepwise. In addition, the pressure is preferably adjusted to be in a higher pressure range than in the conventional art (e.g., 100 MPa or higher). The upper limit of the pressure is not particularly limited as long as the object of the present invention is attained, but may be adjusted to 200 MPa or lower, for example.

The grinding step is a step of removing the machining allowance of the molded body obtained after the molding step, polishing the surface of the molded body, etc. In the grinding step, the removal of the machining allowance, the polishing of the surface of the molded body, etc., are performed by grinding with a resinoid wheel or the like. By such a grinding step, the shape of the molded body is adjusted.

The baking step is a step of baking the molded body whose shape is adjusted by the grinding step, to obtain an insulator. In the baking step, for example, the molded body is baked at 1450° C. or higher and 1650° C. or lower for 1 to 8 hours in an air atmosphere. After baking, the molded body is cooled, thereby obtaining the insulator 11 composed of an alumina-based sintered body.

The insulator 11 is a brittle material and is susceptible to tensile stress. When a force to bend the insulator 11 is applied, cracks propagate from pores and defects inherent in the insulator 11. By observing the structure of a fracture surface created by fracturing the insulator 11, the defects, etc., inherent in the insulator 11 can be clarified. The insulator 11 can be fractured by applying a tensile force thereto using various means, such as the 3-point bending test or 4-point bending test specified in JIS R1601: 2008 and the insulator bending strength test specified in JIS B8031: 2006, thereby creating a fracture surface on the insulator 11.

The insulator bending strength test specified in JIS B8031: 2006 will be described with reference to FIG. 1. The external thread 16 of the spark plug 10 is tightened to an iron jig 18 with a specified maximum torque to fix the spark plug 10 to the jig 18, and then a force F perpendicular to the axial line C is applied to a position within 5 mm from the rear end of the insulator 11. The insulator 11 is pressed at a speed of 10 mm/min or less by the force F without applying any impact to the insulator 11, to fracture the insulator 11 and create a fracture surface thereon.

Figure 2:
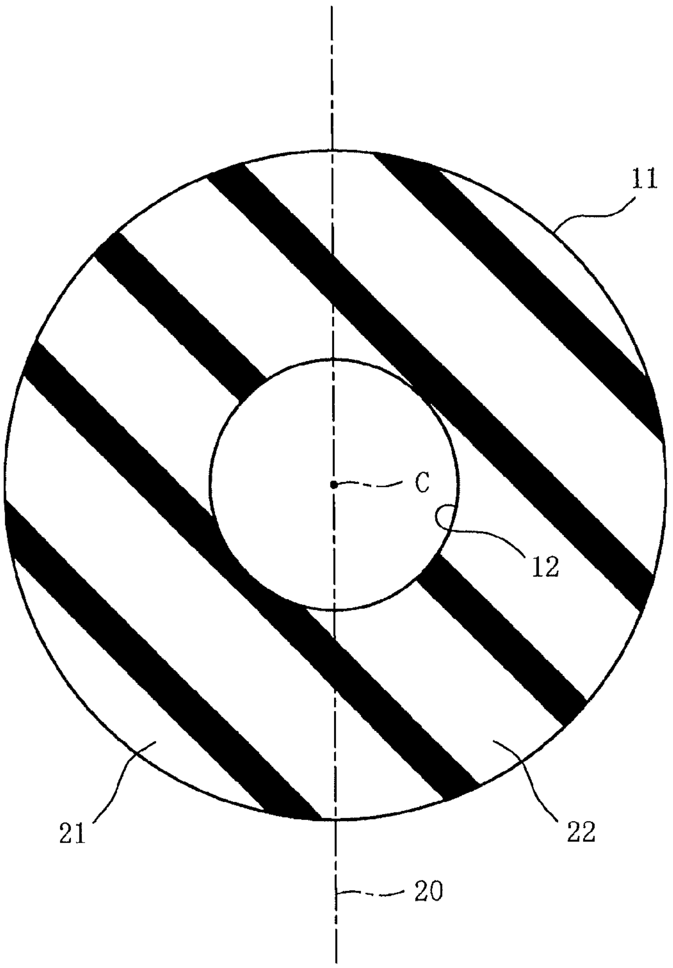
FIG. 2 is a schematic diagram of a fracture surface of an insulator.

FIG. 2 is a schematic diagram of the fracture surface of the insulator 11. Out of ranges 21 and 22 into which the fracture surface (circular ring around the axial hole 12) is divided by a plane 20 which is a plane perpendicular to the direction of the force F (see FIG. 1) applied to the insulator 11 and includes the axial line C, the range 21 including the starting point of the fracture is a surface created mainly by the application of the tensile force. The range 22 is a surface created by the propagation of a crack formed in the range 21. Particles that have grown abnormally during baking are one of the defects inherent in the insulator 11. The structure of the range 21 including the starting point of the fracture (in the present embodiment, the surface including the side where the force F is applied) is observed using a scanning electron microscope (SEM), to examine the size and the distribution of particles in the range 21.

Since the size of particles cannot be confirmed even if the entire range 21 is captured in a single SEM image, the entire range 21 is divided into a plurality of portions and an SEM image (planar image) is acquired for each of the portions. The SEM image is, for example, an image that is obtained when the range 21 is divided into rectangular portions having a size of 985 μm in length and 1231 μm in width and is enlarged at a low magnification (for example, 100 times). The range 21 has a shape obtained by cutting a circular ring in half. Thus, in some SEM images, the axial hole 12 inside the range 21 or the space outside the range 21 may be seen in a part of the rectangular image, but SEM images of the entire range 21 including images in a part of each of which a blank space other than the range 21 exists are acquired.

After the low-magnification SEM image of the entire range 21 is acquired, image analysis is performed using known image analysis software (e.g. WinROOF (registered trademark), made by Mitani Corporation). In the image analysis, the size of each SEM image is calibrated on the basis of a scale bar attached to the SEM image, and then a binarization process is performed on the SEM image in order to extract the edges of the image. In the binarization process, the luminances (brightnesses) of the respective pixels in the SEM image are converted into two gradations using a predetermined threshold value (e.g., a threshold value from 0 to 25). By converting the pixels into two gradations to eliminate intermediate gradations, a binarized image in which grain boundaries are emphasized is acquired.

Using the binarized image of the range 21, the areas of particles are determined by a known image analysis method, and the number of particles having an area of 60 $\mu m^2$ or larger and 600 $\mu m^2$ or smaller (hereinafter referred to as "large particles") out of all particles included in the range 21 is counted. Particles that have grown abnormally during baking are one of the defects that are highly likely to be the starting point of fracture. In the insulator 11, a portion where defects are concentrated becomes the starting point of fracture. Thus, if particles that have grown abnormally during baking are present, such particles appear in the range 21.

In order to reduce defects caused by abnormally grown particles and ensure the bending strength of the insulator 11, the particles present in the planar image of the range 21 have a maximum area of 600 $\mu m^2$ or smaller. The particles present in the planar image of the range 21 preferably have a maximum area of 60 $\mu m^2$ or larger. This is to ensure the toughness of the insulator 11 and ensure the thermal shock resistance of the insulator 11.

In the insulator 11, large particles whose number is 0.1 particles/$mm^2$ or more per unit area are present in the planar image of the range 21. Due to the presence of the large particles, the toughness of the insulator 11 can be ensured. As for the presence of the large particles, the number of the large particles is preferably 6.2 particles/$mm^2$ or less per unit area in the planar image of the range 21. This is to ensure the bending strength of the insulator 11.

Apart from the low-magnification SEM image in which the number of large particles is examined, ten high-magnification SEM images each of which is an enlarged image of a rectangular portion of the range 21 with a size of 100 μm in length and 163 μm in width are acquired randomly. The position at which each high-magnification SEM image is acquired is set such that the range 21 is seen in the entire image and no blank space other than the range 21 is left in a part of the image. After the high-magnification SEM images are acquired, the same image analysis as the process performed on the low-magnification SEM image is performed, and a binarized image in which grain boundaries are emphasized is acquired.

Using the binarized image of the range 21, the areas of all particles appearing in the ten images are determined by a known image analysis method, and the area per particle (average) is determined. Even if the ten images include large particles, each of the large particles is also added as one particle for the area. If a particle is cut off at the edge of the image, the portion thereof appearing in the image is added as one particle for the area. In the insulator 11, the average of the areas of the particles is 4.4 $\mu m^2$ or larger and 8.0 $\mu m^2$ or smaller. This is to improve the bending strength and the thermal shock resistance of the insulator 11.

If the average of the areas of the particles is smaller than 4.4 $\mu m^2$, there is a tendency that the toughness of the insulator 11 decreases and the thermal shock resistance of the insulator 11 decreases. If the average of the areas of the particles is larger than 8.0 $\mu m^2$, there is a tendency that the pores between the particles become larger and the bending strength decreases. To ensure bending strength, the porosity of the insulator 11 is preferably 5% or lower.

The number of particles having an area of 20 $\mu m^2$ or larger and 59 $\mu m^2$ or smaller (hereinafter referred to as "small particles") out of all particles included in the ten images is counted by a known image analysis method. In the insulator 11, small particles whose number is 613 particles/$mm^2$ or more and 2270 particles/$mm^2$ or less per unit area of the ten images are preferably present. This is to improve the thermal shock resistance and the bending strength of the insulator 11 by the presence of the small particles.

EXAMPLES

The present invention will be described in more detail with reference to examples, but the present invention is not limited to the examples.

(Production of Insulator)

Two insulators having the same basic configuration as the insulator 11 of the spark plug 10 illustrated in the embodiment were produced as each of sample Nos. 1 to 12 by the same method as in the embodiment. For the insulators of sample No. 4, when the raw material powder was pulverized using the wet type pulverizer in the slurry preparation step, balls having a diameter of 2 mm and balls having a diameter of 6 mm were mixed and used at a ratio 50 mass % and 50 mass %, respectively. The insulators of sample Nos. 3 and 5 to 8 were produced in the same manner as sample No. 4, except that the ratio of the balls used when pulverizing the raw material powder in the slurry preparation step was changed as appropriate.

For the insulators of sample No. 1, when the raw material powder was pulverized using the wet type pulverizer in the slurry preparation step, balls having a diameter of 8 mm and balls having a diameter of 12 mm were mixed and used at a ratio 50 mass % and 50 mass %, respectively. The insulators of sample Nos. 2 and 9 to 12 were produced in the same manner as sample No. 1, except that the ratio of the balls used when pulverizing the raw material powder in the slurry preparation step was changed as appropriate.

(Insulator Bending Strength Test)

One sample of the spark plug 10 described in the embodiment was produced using one of the insulators of each of sample Nos. 1 to 12 for which two insulators were produced. For each sample, in accordance with the insulator bending strength test specified in JIS B8031: 2006, the spark plug 10 was tightened to the jig 18 with the specified maximum torque, then the force F perpendicular to the axial line C was applied to a position within 5 mm from the rear end of the insulator 11, and the insulator 11 was pressed at a speed of 10 mm/min or less without applying any impact to the insulator 11, until the insulator 11 became fractured. A sample for which the magnitude of the force F (bending strength) when the insulator 11 became fractured was 7.5 kN or larger was determined as A, and a sample for which the bending strength was smaller than 7.5 kN was determined as C.

TABLE 1

| No. | Average ($\mu m^2$) | Maximum ($\mu m^2$) | Number of large particles (particles/mm$^2$) | Number of small particles (particles/mm$^2$) | Bending strength | Thermal shock resistance |
|---|---|---|---|---|---|---|
| 1 | 4.0 | 160 | 1.2 | 245 | A | C |
| 2 | 4.4 | 42 | 0.0 | 798 | A | C |
| 3 | 4.4 | 120 | 0.9 | 245 | A | B |
| 4 | 4.5 | 60 | 0.1 | 920 | A | A |
| 5 | 4.8 | 200 | 2.3 | 613 | A | A |
| 6 | 4.9 | 600 | 2.3 | 1779 | A | A |
| 7 | 7.5 | 452 | 2.3 | 1963 | A | A |
| 8 | 8.0 | 367 | 6.2 | 2270 | A | A |
| 9 | 5.3 | 749 | 2.4 | 613 | C | A |
| 10 | 5.4 | 612 | 2.5 | 1840 | C | A |
| 11 | 8.2 | 470 | 1.8 | 2454 | C | A |
| 12 | 10.1 | 352 | 7.8 | 1779 | C | A |

(Observation of Fracture Surface of Insulator)

The fracture surface of the insulator 11 fractured in the insulator bending strength test was divided into two parts by the plane 20, which is a plane perpendicular to the direction of the force F applied to the insulator 11 and includes the axial line C, and the ranges 21 and 22 were set. Then, the structure of the range 21 including the starting point of the fracture out of the ranges 21 and 22 was observed with a SEM (JEM-IT3 00LA, manufactured by JEOL Ltd.).

The entire range 21 was divided into a plurality of portions, and a plurality of SEM images each of which was an image, of a rectangular portion with a size of 985 μm in length and 1231 μm in width, enlarged at a low magnification (100 times) were acquired. A process by image processing software WinROOF2013 (WinROOF is a registered trademark) was executed to obtain a binarized image, and then the area of the largest particle and the number of large particles having an area of 60 $\mu m^2$ or larger and 600 $\mu m^2$ or smaller per unit area (number rounded to the second decimal place) were obtained by image analysis. The area of the largest particle is indicated in the cell for "Maximum" in Table 1, and the number of large particles per unit area is indicated in the cell for "Number of large particles" in Table 1.

Ten locations in the range 21 were randomly selected, ten high-magnification SEM images each of which was an enlarged image of a rectangular portion with a size of 100 μm in length and 163 μm in width were obtained, and a binarized image was obtained by image processing. Then, the area per particle (average rounded to the second decimal place) and the number of small particles having an area of 20 $\mu m^2$ or larger and 59 $\mu m^2$ or smaller per unit area (rounded to the first decimal place) were obtained by image analysis. The area per particle (average) is indicated in the cell for "Average" in Table 1, and the number of small particles per unit area is indicated in the cell for "Number of small particles" in Table 1.

(Thermal Shock Test)

The insulators 11 of sample Nos. 1 to 12 were stored for 30 minutes in a thermostatic bath kept at a predetermined temperature, and then were immediately placed into water at 20° C. to be rapidly cooled. The posture of each insulator 11 when placed into the water was such that the axial line C of the insulator 11 was parallel to the water surface. The presence or absence of cracks in the insulator 11 taken out of the water was visually checked by applying a penetration flaw detection liquid. The temperature of the thermostatic bath in which the insulator 11 was stored was increased in 10° C. increments from 150° C. until a crack was found at the insulator 11. The thermal shock resistance of a sample for which the temperature difference (critical temperature difference) between the water temperature (20° C.) and the temperature of the thermostatic bath when a crack was found in the insulator 11 was 240° C. or higher, was determined as A, the thermal shock resistance of a sample for which the temperature difference was 230° C. or higher and lower than 240° C. was determined as B, and the thermal shock resistance of a sample for which the temperature difference was lower than 230° C. was determined as C.

As shown in Table 1, for sample Nos. 3 to 8 for which the average of the areas of the particles was 4.4 $\mu m^2$ or larger and 8.0 $\mu m^2$ or smaller, the maximum area was 600 $\mu m^2$ or smaller, and the number of large particles was 0.1 particles/$mm^2$ or more, the bending strength was determined as A, and the thermal shock resistance was determined as A or B.

Meanwhile, for sample No. 2 for which the average of the areas of the particles was 4.4 $\mu m^2$ or larger and 8.0 $\mu m^2$ or smaller and the maximum area was 600 $\mu m^2$ or smaller but the number of large particles was less than 0.1 particles/$mm^2$, the bending strength was determined as A, but the thermal shock resistance was determined as C. It was confirmed that the presence of an appropriate number of large particles is effective for ensuring thermal shock resistance. It is inferred that the presence of an appropriate number of large particles improves the toughness of the insulator.

In sample No. 2, since the maximum particle area was smaller than 60 $\mu m^2$, the number of large particles was 0 particles/$mm^2$. For sample No. 2, it is also considered that since the maximum particle area was smaller than 60 $\mu m^2$, the thermal shock resistance was determined as C. It is inferred that the fact that the maximum area is 60 $\mu m^2$ or larger is effective for improving the toughness of the insulator.

For sample No. 1 for which the maximum particle area was 600 $\mu m^2$ or smaller and the number of large particles was 0.1 particles/$mm^2$ or more but the average of the areas was smaller than 4.4 $\mu m^2$, the bending strength was determined as A, but the thermal shock resistance was determined as C. It was confirmed that the thermal shock resistance is decreased when the average of the areas is smaller than 4.4 $\mu m^2$.

For sample Nos. 9 and 10 for which the average of the areas of the particles was 4.4 $\mu m^2$ or larger and 8.0 $\mu m^2$ or smaller and the number of large particles was 0.1 particles/$mm^2$ or more but the maximum particle area was larger than 600 $\mu m^2$, the thermal shock resistance was determined as A, but the bending strength was determined as C. It was confirmed that there is a tendency that the bending strength is decreased when the maximum particle area is larger than 600 $\mu m^2$.

For sample Nos. 11 and 12 for which the maximum particle area was 600 $\mu m^2$ or smaller and the number of large particles was 0.1 particles/$mm^2$ or more but the average of the areas was larger than 8.0 $\mu m^2$, the thermal shock resistance was determined as A, but the bending strength was determined as C. It was confirmed that there is a tendency that the bending strength is decreased when the average of the areas is larger than 8.0 $\mu m^2$.

In sample No. 12, since the number of large particles was 7.8 particles/$mm^2$ and was large, the average of the areas of the particles including the large particles was 10.1 $\mu m^2$. In order to set the average of the areas of the particles to be within a range of 4.4 $\mu m^2$ or larger and 8.0 $\mu m^2$ or smaller, the number of large particles was suitable to be 6.2 particles/$mm^2$ or less as in sample No. 8.

For sample Nos. 4 to 8 for which the average of the areas of the particles was 4.4 $\mu m^2$ or larger and 8.0 $\mu m^2$ or smaller, the maximum area was 600 $\mu m^2$ or smaller, the number of large particles was 0.1 particles/$mm^2$ or more, and the number of small particles was 613 particles/$mm^2$ or more and 2270 particles/$mm^2$ or less, both the bending strength and the thermal shock resistance were determined as A. It was found that the fact that the number of small particles being present is 613 particles/$mm^2$ or more and 2270 particles/$mm^2$ or less is effective for improving thermal shock resistance.

Although the present invention has been described above based on the embodiment, the present invention is not limited to the above embodiment at all. It can be easily understood that various modifications may be made without departing from the gist of the present invention. For example, the shape of the insulator 11 is an example and can be set as appropriate.

In the embodiment, the case where a fracture surface is created by fracturing the insulator 11 in accordance with the spark plug insulator bending strength test specified in JIS B8031: 2006 has been described, but the present invention is not necessarily limited thereto. As a matter of course, it is possible to fracture the insulator 11 before assembling the center electrode 13, the metal shell 15, etc., to form a spark plug, in accordance with the 3-point bending test or 4-point bending test specified in JIS R1601: 2008, to create a fracture surface.

In the 3-point bending test or 4-point bending test specified in JIS R1601: 2008, a force is applied between two fulcrums for the insulator 11 supported by the fulcrums to fracture the insulator 11. The side where the fulcrums are in contact with the insulator 11 is the range 21 including the starting point of the fracture.

In the embodiment, the spark plug 10 including the ground electrode 17 which is exposed to a combustion chamber when the spark plug 10 is mounted on an engine (not shown) has been described, but the present invention is not necessarily limited thereto. As a matter of course, it is possible to apply the configuration of the embodiment to a spark plug including the ground electrode 17 which is covered with a cap provided with a through hole (a spark plug that provides a sub chamber in a combustion chamber).

In the embodiment, the spark plug 10 in which spark discharge occurs between the center electrode 13 and the ground electrode 17 has been described, but the present invention is not necessarily limited thereto. As a matter of course, it is possible to apply the configuration of the embodiment to a spark plug that uses non-equilibrium plasma generated around the center electrode 13.

DESCRIPTION OF REFERENCE NUMERALS

10 spark plug
11 insulator (spark plug insulator)
12 axial hole
20 plane
21 range
C axial line

What is claimed is:

1. A spark plug insulator composed of an alumina-based sintered body provided with an axial hole extending along an axial line, wherein when a force to bend the spark plug insulator is applied to the spark plug insulator to fracture the spark plug insulator, for a range including a starting point of the fracture out of two ranges into which a fracture surface created by the fracture is divided by a plane which is a plane perpendicular to a direction of the force and includes the axial line, an average of areas of particles appearing in a planar image of the range is 4.4 $\mu m^2$ or larger and 8.0 $\mu m^2$ or smaller, and a maximum area of the particles is 600 $\mu m^2$ or smaller, the particles include large particles having an area of 60 μm$^2$ or larger and 600 μm$^2$ or smaller, and as the large particles, 0.1 particles/mm$^2$ or more are present per unit area of the planar image.

2. The spark plug insulator according to claim 1, wherein, as the large particles, 6.2 particles/mm$^2$ or less are present per unit area of the planar image.

3. The spark plug insulator according to claim 1, wherein the particles include small particles having an area of 20 μm$^2$ or larger and 59 μm$^2$ or smaller, and as the small particles, 613 particles/mm$^2$ or more and 2270 particles/mm$^2$ or less are present per unit area of the planar image.

4. A spark plug including the spark plug insulator according to claim 1.

* * * * *